US011892587B2

(12) United States Patent
Xue et al.

(10) Patent No.: US 11,892,587 B2
(45) Date of Patent: Feb. 6, 2024

(54) DISTRIBUTED THREE-DIMENSIONAL (3D) INDUCED POLARIZATION (IP) DATA ACQUISITION AND PROCESSING DEVICE AND METHOD

(71) Applicant: Chinese Academy of Geological Sciences, Beijing (CN)

(72) Inventors: Ronghui Xue, Beijing (CN); Guixiang Meng, Beijing (CN); Jiayong Yan, Beijing (CN)

(73) Assignee: CHINESE ACADEMY OF GEOLOGICAL SCIENCES, Beijing (CN)

( * ) Notice: Subject to any disclaimer, the term of this patent is extended or adjusted under 35 U.S.C. 154(b) by 96 days.

(21) Appl. No.: 17/697,228

(22) Filed: Mar. 17, 2022

(65) Prior Publication Data
US 2023/0228903 A1  Jul. 20, 2023

(30) Foreign Application Priority Data
Jan. 18, 2022  (CN) .......................... 202210054109.8

(51) Int. Cl.
*G01V 3/38* (2006.01)
*G01V 3/02* (2006.01)
*G01V 3/36* (2006.01)

(52) U.S. Cl.
CPC .................. *G01V 3/38* (2013.01); *G01V 3/02* (2013.01); *G01V 3/36* (2013.01)

(58) Field of Classification Search
CPC ... G01V 3/38; G01V 3/02; G01V 3/04; G01V 3/06; G01V 3/08; G01V 3/36
(Continued)

(56) References Cited

U.S. PATENT DOCUMENTS 4,041,372 A * 8/1977 Miller ...................... G01V 3/06
324/362
6,236,211 B1 * 5/2001 Wynn ...................... G01V 3/02
324/365
(Continued)

FOREIGN PATENT DOCUMENTS

CN    105044791 A  * 11/2015
CN    108776354 A  * 11/2018  ............... G01V 3/08
(Continued)

OTHER PUBLICATIONS

Revil et al., Electrical conductivity and induced polarization investigations at Krafla volcano, Iceland. Journal of Volcanology and Geothermal Research 368 (2018) 73-90. Nov. 13, 2018 (Year: 2018).*
(Continued)

*Primary Examiner* — Patrick Assouad
*Assistant Examiner* — Sean Curtis
(74) *Attorney, Agent, or Firm* — Nelson Mullins Riley & Scarborough LLP (57) ABSTRACT

A distributed three-dimensional (3D) induced polarization (IP) data acquisition and processing device, including: a transmitter module, a computer and multiple receiver modules, where the transmitter module is configured to transmit a preset current signal to a ground where a region to be measured is located, and record the current signal in real time; the receiver modules each are configured to acquire a voltage signal and an apparent polarizability of the ground where the region to be measured is located, and record the voltage signal and the apparent polarizability in real time; and the computer is configured to acquire the current signal, the voltage signal and the apparent polarizability, respectively process the current signal and the voltage signal to obtain an apparent resistivity of the region to be measured, and analyze, according to the apparent polarizability and the
(Continued)

apparent resistivity, a polarizability and a conductivity of the region to be measured.

16 Claims, 3 Drawing Sheets

(58) Field of Classification Search
USPC ........................................................ 324/362
See application file for complete search history.

(56) References Cited

U.S. PATENT DOCUMENTS

| | | | | |
|---|---|---|---|---|
| 6,236,212 | B1 * | 5/2001 | Wynn ...................... | G01V 3/06 |
| | | | | 324/365 |
| 8,463,568 | B1 * | 6/2013 | Wynn ................ | G01N 33/1833 |
| | | | | 324/362 |
| 9,256,003 | B2 * | 2/2016 | Li ........................... | E21B 49/08 |
| 9,983,328 | B2 * | 5/2018 | Marsala ................... | G01V 3/26 |
| 10,156,654 | B2 * | 12/2018 | Marsala ................... | G01V 3/26 |
| 10,379,250 | B2 * | 8/2019 | Wilt ........................ | G01V 3/30 |
| 2015/0077119 | A1 * | 3/2015 | Li ........................... | G01V 3/083 |
| | | | | 324/324 |
| 2016/0291194 | A1 * | 10/2016 | Marsala ................... | G01V 3/38 |
| 2018/0136359 | A1 * | 5/2018 | Wilt ........................ | G01V 3/08 |
| 2018/0275306 | A1 * | 9/2018 | Marsala ................... | G01V 3/24 |
| 2023/0228903 | A1 * | 7/2023 | Xue ........................ | G01V 3/02 |
| | | | | 324/362 |

FOREIGN PATENT DOCUMENTS

| | | | | | |
|---|---|---|---|---|---|
| CN | 108776355 | A | * | 11/2018 | |
| CN | 109188541 | A | * | 1/2019 | ............... G01V 3/38 |
| CN | 110208867 | A | * | 9/2019 | |
| CN | 110187398 | B | * | 12/2020 | ............... G01V 3/20 |
| CN | 114384593 | A | * | 4/2022 | ............... G01V 3/02 |
| CN | 115542406 | A | * | 12/2022 | |
| WO | WO-2014110689 | A1 | * | 7/2014 | ............. E21B 49/08 |
| WO | WO-2016183656 | A1 | * | 11/2016 | |
| WO | WO-2021134929 | A1 | * | 7/2021 | ............... G01V 3/20 |
| WO | WO-2021206580 | A1 | * | 10/2021 | |

OTHER PUBLICATIONS

Revil et al., Induced Polarization as a Tool to Assess Mineral Deposits: A Review. Minerals 2022, 12, 571. https://doi.org/10.3390/min12050571 https://www.mdpi.com/journal/minerals (Year: 2022).*

Yang et al., Application of Induced Polarization Method in Mineral Resource Exploration. Sustainability 2023, 15, 3840. https://doi.org/10.3390/su15043840 https://www.mdpi.com/journal/sustainability (Year: 2023).*

Iris Instruments. SYSCAL PRO resitivity and & IP equipment. iris-instruments.com (Year: 2020).*

English Translation of CN 110187398 A. (Year: 2020).*

Iris Instruments—Processing Software. http://www.iris-instruments.com/download.html. Aug. 19, 2016 (Year: 2016).*

Iris Instruments—Prosys II. http://www.iris-instruments.com/Pdf_file/Prosys_Gb.pdf. Oct. 20, 2016 (Year: 2016).*

Iris Instruments—FullWave Viewer. http://www.iris-instruments.com/Pdf_file/Fullwaveviewer_Gb.pdf. May 5, 2017. (Year: 2017).*

* cited by examiner

DISTRIBUTED THREE-DIMENSIONAL (3D) INDUCED POLARIZATION (IP) DATA ACQUISITION AND PROCESSING DEVICE AND METHOD

CROSS REFERENCE TO RELATED APPLICATION

This patent application claims the benefit and priority of Chinese Patent Application No. 202210054109.8, filed on Jan. 18, 2022, the disclosure of which is incorporated by reference herein in its entirety as part of the present application.

TECHNICAL FIELD

The present disclosure relates to the technical field of seismic exploration and data acquisition, and in particular, to a distributed three-dimensional (3D) induced polarization (IP) data acquisition and processing device and method.

BACKGROUND ART

IP is established based on differences between rocks, minerals and underground water in IP effect. It is intended to observe changes of underground media in polarizability and apparent resistivity with a device at a certain polar distance under the action of artificial sources, thereby solving such geological problems as resources and minerals. As one of the oldest and the most mature methods in geophysical exploration, the conventional polarization plays an important role in exploration of shallow water resources and mineral resources, and is particularly effective for sulfide-containing metal ores. The conventional IP measurement is often used in the surface scanning measurement to obtain a direct measurement result for the earth's surface in one region. But it is applied to underground depth measurement with the poor effect and low efficiency.

Originally developed from seismic exploration, distributed acquisition has been extensively used after decades years of development. With the distributed multi-channel data acquisition, data volumes in seismic exploration are increased by thousands of times. The progresses achieved in automatic data acquisition and data interpretation are also advantageous to yield the higher efficiency and accuracy in the seismic exploration. Therefore, with methods similar to the distributed multi-channel data acquisition in seismic exploration, the data acquisition density and exploration resolution in electrical exploration can be greatly increased. However, the distributed acquisition is rarely seen in the electrical exploration. There are neither mature acquisition technologies and assorted software, nor uniform technical standards. Nevertheless, the distributed acquisition in the electrical exploration has a potential for rapid growth, though lagging behind that in seismic exploration by about 20 years.

In recent years, while people impose increasingly higher requirements on the accuracy of the electrical exploration, distributed 3D electrical exploration has attracted more attentions. Aiming at improving the resolution in the electrical exploration, it records distribution information of electric fields in 3D spaces with the multi-channel distributed method as much as possible, and interprets data with 3D forward modeling and inversion computation. The so-called distributed method means that an acquisition station automatically records signals through global positioning system (GPS) synchronization instead of a cable connection to obtain the relationship between a transmitter and a receiver. The distributed multi-channel acquisition method in electrical exploration mainly includes a large netlike distributed acquisition station. It not only prevents the capacity coupling problem caused by cables, but also has the flexible deployment and can quickly acquire data and eliminate noise. However, the conventional electrical exploration is mainly used to explore shallow mineral resources, with the single data acquisition method and low efficiency. A data acquisition device includes a transmitter and a receiver. Whenever the measurement is made at different measuring points, there is a need to change the position of the receiver, and only a group of data at the present measuring point are measured. If data at different measuring points are desired to be obtained, the position of the receiver is changed continuously. Therefore, the rich measurement information cannot be obtained efficiently.

SUMMARY

An objective of the present disclosure is to provide a distributed 3D IP data acquisition and processing device and method, to improve the data acquisition efficiency and obtain rich data.

To implement the above objective, the present disclosure provides the following solutions.

The present disclosure provides a distributed 3D IP data acquisition and processing device, including: a transmitter module, a computer and multiple receiver modules, where
  the transmitter module is configured to transmit a preset current signal to a ground where a region to be measured is located, and record the current signal in real time;
  the receiver modules each are configured to acquire a voltage signal and an apparent polarizability of the ground where the region to be measured is located, and record the voltage signal and the apparent polarizability in real time; and
  the computer is configured to acquire the current signal, the voltage signal and the apparent polarizability, respectively process the current signal and the voltage signal to obtain an apparent resistivity of the region to be measured, and analyze, according to the apparent polarizability and the apparent resistivity, a polarizability and a conductivity of the region to be measured.

Optionally, the transmitter module may include: a transmitter, a current recorder and at least two transmitting electrodes, where
  the transmitter may be configured to transmit the preset current signal;
  the transmitting electrodes each may be connected to the transmitter and the ground, and configured to transmit the current signal to the ground; and
  the current recorder may be connected to each of the transmitting electrodes, and configured to record the current signal transmitted by the transmitter in real time.

Optionally, the receiver modules each may include: a voltage recorder and at least three receiving electrodes, where
  the receiving electrodes each may be connected to the ground, and configured to acquire a voltage signal flowing through the ground; and
  the voltage recorder may be connected to each of the receiving electrodes, and configured to acquire the voltage signal and the apparent polarizability of the ground where the region to be measured is located, and record the voltage signal and the apparent polarizability.

Optionally, when there are three receiving electrodes, the three receiving electrodes may be arranged in an L-shaped distribution.

Optionally, the transmitter module and the receiver module each may be provided with a GPS locator.

To achieve the above-mentioned objective, the present disclosure further provides a distributed 3D IP data acquisition and processing method, which is implemented based on the device and includes:

acquiring a current signal of a region to be measured, the current signal being a preset current signal transmitted by a transmitter module to a ground where the region to be measured is located;

acquiring a voltage signal and an apparent polarizability of the region to be measured, the voltage signal being a voltage signal acquired by each of receiver modules for the ground where the region to be measured is located; and respectively processing the current signal and the voltage signal to obtain an apparent resistivity of the region to be measured.

Optionally, the method may further include: analyzing, according to the apparent polarizability and the apparent resistivity, a polarizability and a conductivity of the region to be measured.

Optionally, the respectively processing the current signal and the voltage signal to obtain an apparent resistivity of the region to be measured may specifically include:

reading the current signal and the voltage signal with fullwave viewer software, and performing time matching on the current signal and the voltage signal to obtain time matched current data and time matched voltage data;

transforming, with ProsysII software, a position number of each of receiving electrodes corresponding to the time matched voltage data to obtain an actual coordinate of each of the receiving electrodes; and computing the apparent resistivity based on the time matched current data, the time matched voltage data, the actual coordinate of each of the receiving electrodes, and an actual coordinate of each of transmitting electrodes.

Optionally, the apparent resistivity $P_s$ may be specifically computed as follows:

$$P_s = \frac{K \cdot V}{I};$$

and $$K = \frac{2\pi}{\frac{1}{AM} - \frac{1}{AN} - \frac{1}{BM} + \frac{1}{BN}},$$

where, A and B may be the transmitting electrodes, M and N may be the receiving electrodes, AM may represent a distance between the transmitting electrode A and the receiving electrode M, AN may represent a distance between the transmitting electrode A and the receiving electrode N, BN may represent a distance between the transmitting electrode B and the receiving electrode N, BM may represent a distance between the transmitting electrode B and the receiving electrode M, $\pi$ may represent a circular constant, V may represent a measured potential difference, I may represent a transmitting current, and K may represent a dimensionless coefficient associated with a position of each of the transmitting electrodes and the receiving electrodes.

Optionally, the analyzing, according to the apparent polarizability and the apparent resistivity, a polarizability and a conductivity of the region to be measured may specifically include:

inverting the actual coordinate of each of the receiving electrodes, the actual coordinate of each of the transmitting electrodes, the apparent resistivity and the apparent polarizability with 3D inversion software to obtain 3D distribution data, the 3D distribution data being configured to reflect underground polarizability and conductivity of the region to be measured; and visualizing the 3D distribution data with a 3D slicing technology or a spatial contour drawing method to obtain a 3D slice map for the apparent polarizability, a contour map for the apparent polarizability, a 3D slice map for the apparent resistivity and a contour map for the apparent resistivity.

Based on specific embodiments provided in the present disclosure, the present disclosure has the following technical effects:

According to the distributed 3D IP data acquisition and processing device and method provided by the present disclosure, the device includes: a transmitter module, a computer and multiple receiver modules, where the transmitter module is configured to transmit a preset current signal to a ground where a region to be measured is located, and record the current signal in real time; the receiver modules each are configured to acquire a voltage signal and an apparent polarizability of the ground where the region to be measured is located, and record the voltage signal and the apparent polarizability in real time; and the computer is configured to acquire the current signal, the voltage signal and the apparent polarizability, respectively process the current signal and the voltage signal to obtain an apparent resistivity of the region to be measured, and analyze, according to the apparent polarizability and the apparent resistivity, a polarizability and a conductivity of the region to be measured. With one transmitter module and multiple receiver modules, the present disclosure makes the data acquisition efficiency higher and the data richer.

BRIEF DESCRIPTION OF THE DRAWINGS

To describe the embodiments of the present disclosure or the technical solutions in the prior art more clearly, the accompanying drawings required in the embodiments are briefly introduced below. Obviously, the accompanying drawings described below are only some embodiments of the present disclosure. A person of ordinary skill in the art may further obtain other accompanying drawings based on these accompanying drawings without creative labor.

REFERENCE NUMERALS transmitter module-1, transmitter-11, current recorder-12, transmitting electrode-13, generator-14, computer-2, receiver module-3, voltage recorder-31, and receiving electrode-32.

DETAILED DESCRIPTION OF THE EMBODIMENTS

The technical solutions in the embodiments of the present disclosure are clearly and completely described below with reference to the accompanying drawings. Apparently, the described embodiments are merely some rather than all of the embodiments of the present disclosure. Based on the embodiments of the present disclosure, all other embodiments obtained by the person of ordinary skill in the art without creative efforts shall fall within the protection scope of the present disclosure.

An objective of the present disclosure is to provide a distributed 3D IP data acquisition and processing device and method, to improve the data acquisition efficiency and obtain rich data.

To make the foregoing objective, features, and advantages of the present disclosure clearer and more comprehensible, the present disclosure will be further described in detail below with reference to the accompanying drawings and specific embodiments.

Figure 1:
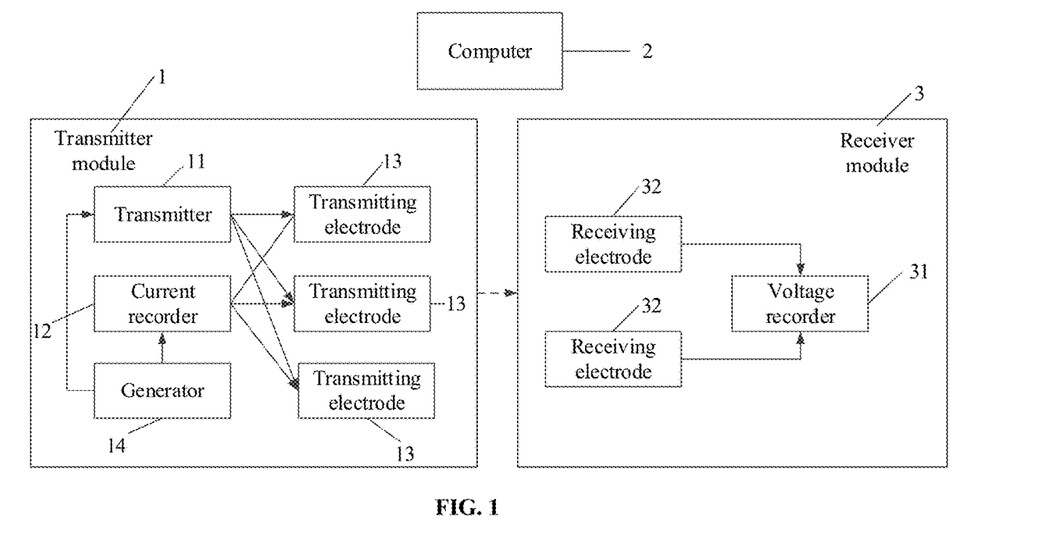
FIG. 1 illustrates a modular structure of a distributed 3D IP data acquisition and processing device according to the present disclosure.

As shown in FIG. 1, the present disclosure provides a distributed 3D IP data acquisition and processing device, including: a transmitter module 1, a computer 2 and multiple receiver modules 3.

The transmitter module 1 is configured to transmit a preset current signal to a ground where a region to be measured is located, and record the current signal in real time.

The receiver modules 3 each are configured to acquire a voltage signal and an apparent polarizability of the ground where the region to be measured is located, and record the voltage signal and the apparent polarizability in real time.

The computer 2 is configured to acquire the current signal, the voltage signal and the apparent polarizability, respectively process the current signal and the voltage signal to obtain an apparent resistivity of the region to be measured, and analyze, according to the apparent polarizability and the apparent resistivity, a polarizability and a conductivity of the region to be measured.

Specifically, as shown in FIG. 1, the transmitter module 1 includes: a transmitter 11, a current recorder 12 and at least two transmitting electrodes 13.

The transmitter 11 is configured to transmit the preset current signal.

The transmitting electrodes 13 each are connected to the transmitter 11 and the ground, and configured to transmit the current signal to the ground.

The current recorder 12 is connected to each of the transmitting electrodes, and configured to record the current signal transmitted by the transmitter 11 in real time.

Further, the transmitter module 1 further includes: a generator 14, respectively connected to the transmitter 11 and the current recorder 12, and configured to power the transmitter 11 and the current recorder 12.

Further, the transmitter 11 is connected to the transmitting electrodes 13 through a transmitting cable.

Figure 2:
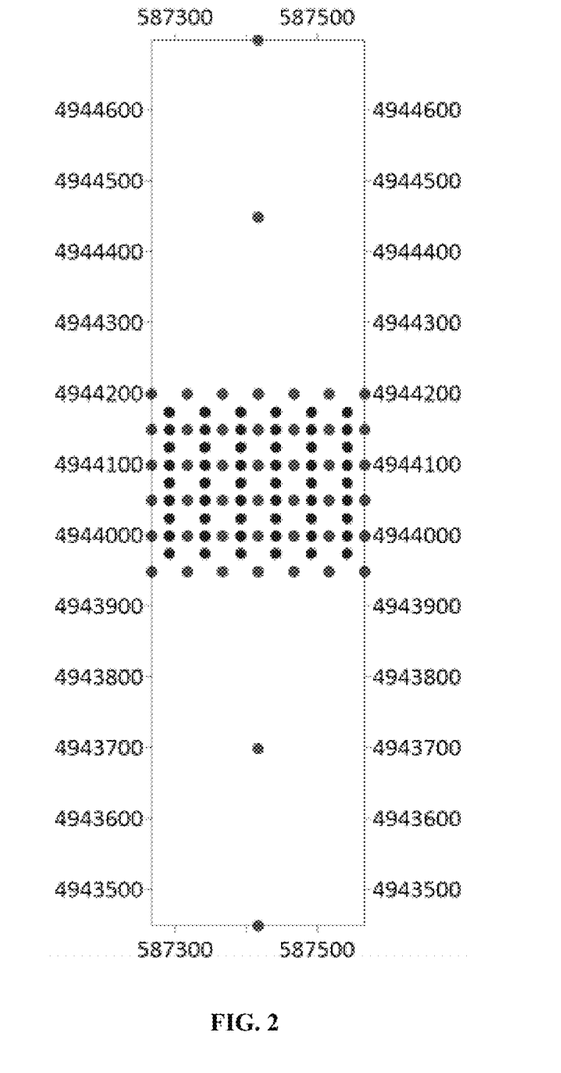
FIG. 2 illustrates an electrode arrangement of a distributed 3D IP data acquisition and processing device according to the present disclosure.

Specifically, the transmitting electrodes 13 may be arranged at any positions in the region to be measured, provided that specific coordinate positions of the transmitting electrodes 13 are recorded in measurement. The transmitter 11 is configured to provide a specified transmitting current. The current recorder 12 records full-waveform current-time sequence data. Without unattended operation, it can continuously record the current data transmitted by the transmitter 11 in real time. In a specific embodiment of the present disclosure, the current recorder 12 is serially connected to the transmitting cable, with the maximum current recorded being 25 A. The transmitter 11 may be provided at a position nearer to the generator 14, and may also be provided at a position nearer to any transmitting electrode 13. As shown in FIG. 2, the dark dots represent the transmitting electrodes 13. For the sake of a better measurement effect, the transmitting electrodes may be uniformly arranged inside and outside the region to be measured.

Specifically, the receiver modules 3 each include: a voltage recorder 31 and at least three receiving electrodes 32.

The receiving electrodes 32 each are connected to the ground, and configured to acquire a voltage signal flowing through the ground.

The voltage recorder 31 is connected to each of the receiving electrodes 32, and configured to acquire the voltage signal and the apparent polarizability of the ground where the region to be measured is located, and record the voltage signal and the apparent polarizability.

Further, the receiving electrodes 32 each are connected to the voltage recorder 31 through a connecting cable.

Preferably, when there are three receiving electrodes 32, the three receiving electrodes are arranged in an L-shaped distribution. As shown in FIG. 2, the light dots represent the receiving electrodes. Three receiving electrodes are arranged in the L-shaped distribution, every three receiving electrodes are formed into one group and two independent acquisition channels are provided. Two receiving electrodes located at ends of the L-shaped distribution are configured to acquire full-waveform data of electric fields in two directions. The electrode at a corner of the L-shaped distribution is a common electrode. The potential difference between each receiving electrode at the end and the common electrode is the voltage signal to be measured and recorded by the voltage recorder. In actual applications, two channels of the voltage recorder may be arranged at any directions. The receiving electrodes arranged in the L-shaped distribution can measure data of two orthogonal components. However, the receiving electrodes arranged in the same direction can strengthen the data in that direction to achieve the depth measurement effect. The receiving electrodes arranged in other directions can be used for different specific measurement purposes, and will not be limited herein. No matter what arrangement is used, the coordinate positions of the receiving electrodes are recorded.

Further, the region to be measured is covered by multiple receiver modules. The multiple receiver modules can be arranged into any observation form, provided that specific coordinate positions of the electrodes are recorded. The specific number of voltage recorders may be determined according to the observation purpose, and will not be limited herein.

Further, the transmitter module 1 and the receiver module 3 each are provided with a GPS locator. Specifically, the voltage recorder 31 and the current recorder 12 each are provided with the GPS locator, and configured to perform time matching on the voltage data and the current data.

In a specific embodiment of the present disclosure, whenever the measurement is made, the transmitter module 1 provides the preset current signal, and the voltage recorder 31 receives the measured voltage signal. For each measurement on the same measuring region, the position of the transmitting electrode 11, rather than the position of the voltage recorder 31, is moved to measure depths at different positions. During each measurement, multiple groups of acquired data are obtained from multiple receiver modules to make the data acquisition efficiency higher and the data richer. Whenever the position of the transmitting electrode 11 is changed, there is a need to turn off the transmitter module, and thus the current recorder 12 only records data in current transmission. Nevertheless, the voltage recorder 31 is not turned off and will record data in the whole measurement period.

Figure 3:
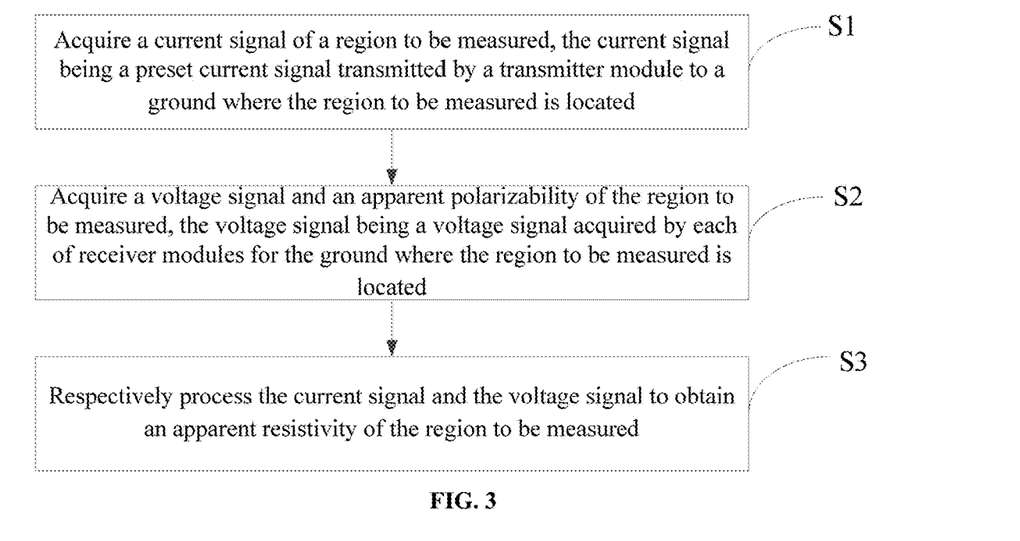
FIG. 3 illustrates a flow chart of a distributed 3D IP data acquisition and processing method according to the present disclosure.

To achieve the above-mentioned objective, as shown in FIG. 3, the present disclosure further provides a distributed 3D IP data acquisition and processing method, which is implemented based on the device and includes the following steps:

S1: A current signal of a region to be measured is acquired, the current signal being a preset current signal transmitted by a transmitter module to a ground where the region to be measured is located.

S2: A voltage signal and an apparent polarizability of the region to be measured are acquired, the voltage signal being a voltage signal acquired by each of receiver modules for the ground where the region to be measured is located.

S3: The current signal and the voltage signal are respectively processed to obtain an apparent resistivity of the region to be measured.

Further, the method further includes Step S4: a polarizability and a conductivity of the region to be measured are analyzed according to the apparent polarizability and the apparent resistivity.

Specifically, Step S3 specifically includes:

The current signal and the voltage signal are read with fullwave viewer software, and time matching is performed on the current signal and the voltage signal to obtain time matched current data and time matched voltage data. The current recorder 12 and the voltage recorder 31 respectively record acquired current data and voltage data. The two types of data are recorded independently and unrelated. The two types of original data are respectively read with the fullwave viewer software and related through time matching and computation.

A position number of each of receiving electrodes corresponding to the time matched voltage data is transformed with ProsysII software to obtain an actual coordinate of each of the receiving electrodes. For convenience, the voltage recorder 31 only records the position numbers, rather than actual spatial coordinates, of the receiving electrodes. Therefore, a coordinate transformation file is created. The actual coordinate positions are imported to the data file according to the position numbers in the voltage recorder to obtain data of different voltage recorders for corresponding measuring points.

The apparent resistivity is computed based on the time matched current data, the time matched voltage data, the actual coordinate of each of the receiving electrodes, and an actual coordinate of each of transmitting electrodes.

Specifically, the apparent resistivity $P_s$ is specifically computed as follows:

$$P_s = \frac{K \cdot V}{I};$$

and $$K = \frac{2\pi}{\frac{1}{AM} - \frac{1}{AN} - \frac{1}{BM} + \frac{1}{BN}},$$

where, A and B are the transmitting electrodes, M and N are the receiving electrodes, AM represents a distance between the transmitting electrode A and the receiving electrode M, AN represents a distance between the transmitting electrode A and the receiving electrode N, BN represents a distance between the transmitting electrode B and the receiving electrode N, BM represents a distance between the transmitting electrode B and the receiving electrode M, $\pi$ represents a circular constant, V represents a measured potential difference, I represents a transmitting current, and K represents a dimensionless coefficient associated with a position of each of the transmitting electrodes and the receiving electrodes. The measured potential difference V is measured by the voltage recorder, and the transmitting current I is measured by the current recorder.

In a specific embodiment of the present disclosure, the electrode arrangement, X, Y and Z coordinates of the electrode A, the electrode B, the electrode M and the electrode N, deviation, natural potential, primary potential, and measurement period are further recorded.

Further, different instruments have different original data formats in the prior art. Data generated by the IRIS observation system is read and edit by the fullwave viewer software, while data generated by the Horn3D observation system is read and edit by rocket software. The present disclosure designs a data processing program embedded into the rocket software. The program can read data acquired by the IRIS observation system and data acquired by the Horn3D observation system, and process the acquired data. With one piece of software, original data generated by different observation systems are merged to make the data processed more efficiently and conveniently. In addition, the data processing program in the present disclosure can implement the data reading and editing functions of the fullwave viewer software, as well as the data processing function of the ProsysII software.

Further, Step S4 specifically includes:

The actual coordinate of each of the receiving electrodes, the actual coordinate of each of the transmitting electrodes, the apparent resistivity and the apparent polarizability are inverted with 3D inversion software to obtain 3D distribution data, the 3D distribution data being configured to reflect underground polarizability and conductivity of the region to be measured. The contents in the 3D distribution data file are as shown in Table 1: Data on each column includes: X coordinates, Y coordinates, Z coordinates, resistivities, polarizabilities, and sensitivities of inverse points. Data on each row includes relevant information of one inverse point. The whole data system reflects the 3D distribution of the underground conductivities and polarizabilities.

TABLE 1

| Contents of the 3D distribution data file | | | | | |
|---|---|---|---|---|---|
| X coordinate | Y coordinate | Z coordinate | Resistivity | Polarizability | Sensitivity |
| 584851 | 4941446 | 0 | 69.0816 | 5.31353 | 0.00000078971 |
| 584694 | 4941291 | 0 | 69.0816 | 5.31353 | 0.00000078971 |
| 585163 | 4941446 | 0 | 68.7023 | 5.30517 | 0.00000128990 |
| 585475 | 4941446 | 0 | 68.0882 | 5.29165 | 0.00000137410 |
| 585788 | 4941446 | 0 | 67.2365 | 5.27509 | 0.00000149330 |

Figure 4:
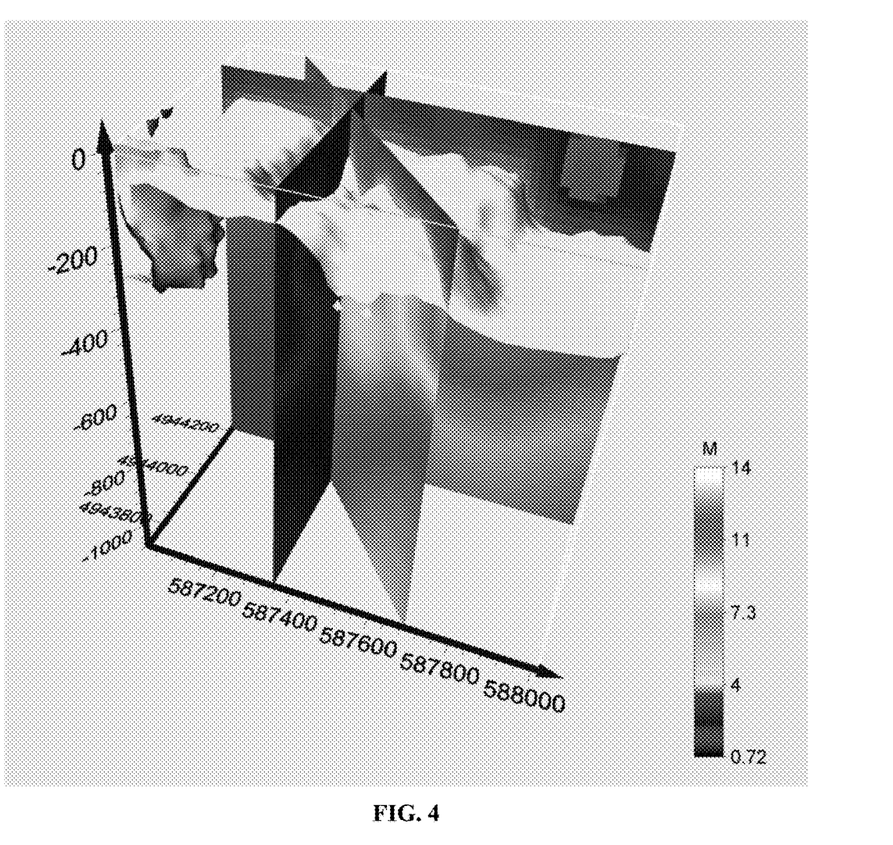
FIG. 4 illustrates a 3D slice.

The 3D distribution data is visualized with a 3D slicing technology or a spatial contour drawing method to obtain a 3D slice map for the apparent polarizability, a contour map for the apparent polarizability, a 3D slice map for the apparent resistivity and a contour map for the apparent resistivity. Specifically, the 3D distribution data includes all inversion results in the 3D distribution. In actual applications, for the display purpose, data in the 3D data system is divided into slice maps in specific directions for analysis. The slice maps may be displayed in transverse, longitudinal and horizontal directions, and may also be displayed in any direction as required. If the position of the required slice is not the position where the data point is located, the data is spatially gridded again to obtain the required slicing data. The 3D slice map is as shown in FIG. 4. In addition, by smoothly connecting data points having the same values in the space, the 3D spatial contour map for the apparent resistivity or apparent polarizability may also be generated. With the spatial contour map, distribution and extension of contour surfaces in the data system can be determined.

The 3D IP measurement method of the present disclosure can implement the 3D IP measurement for large regions to obtain rich data, and can obtain the distribution of the underground resistivity and polarizability through the 3D inversion. Therefore, it is of great significance to mineral resource exploration and geologic rock and structure identification.

Each embodiment of the present specification is described in a progressive manner, and each embodiment focuses on the difference from other embodiments. The same and similar parts between the embodiments may be referred to each other.

In this specification, several specific embodiments are used for illustration of the principles and implementations of the present disclosure. The description of the foregoing embodiments is used to help illustrate the method of the present disclosure and the core ideas thereof. In addition, persons of ordinary skill in the art can make various modifications in terms of specific implementations and the scope of application in accordance with the ideas of the present disclosure. In conclusion, the content of this specification shall not be construed as a limitation to the present disclosure.

What is claimed is:

1. A distributed three-dimensional (3D) induced polarization (IP) data acquisition and processing device, comprising:
a transmitter module, a computer and multiple receiver modules, wherein
the transmitter module is configured to transmit a preset current signal to a ground where a region to be measured is located, and record the current signal in real time;
the receiver modules each are configured to acquire a voltage signal and an apparent polarizability of the ground where the region to be measured is located, and record the voltage signal and the apparent polarizability in real time; and
the computer is configured to acquire the current signal, the voltage signal and the apparent polarizability, respectively process the current signal and the voltage signal to obtain an apparent resistivity of the region to be measured, and analyze, according to the apparent polarizability and the apparent resistivity, a polarizability and a conductivity of the region to be measured;
wherein the receiver modules each comprise: a voltage recorder and at least three receiving electrodes, the receiving electrodes each are connected to the ground, and configured to acquire a voltage signal flowing through the ground; and the voltage recorder is connected to each of the receiving electrodes, and configured to acquire the voltage signal and the apparent polarizability of the ground where the region to be measured is located, and record the voltage signal and the apparent polarizability, and
wherein when there are three receiving electrodes, the three receiving electrodes are arranged in an L-shaped distribution.

2. The distributed 3D IP data acquisition and processing device according to claim 1, wherein the transmitter module comprises: a transmitter, a current recorder and at least two transmitting electrodes, wherein
the transmitter is configured to transmit the preset current signal;
the transmitting electrodes each are connected to the transmitter and the ground, and configured to transmit the current signal to the ground; and
the current recorder is connected to each of the transmitting electrodes, and configured to record the current signal transmitted by the transmitter in real time.

3. The distributed 3D IP data acquisition and processing device according to claim 1, wherein the transmitter module and the receiver module each are provided with a global positioning system (GPS) locator.

4. A distributed three-dimensional (3D) induced polarization (IP) data acquisition and processing method, comprising: acquiring a current signal of a region to be measured, the current signal being a preset current signal transmitted by a transmitter module to a ground where the region to be measured is located; acquiring a voltage signal and an apparent polarizability of the region to be measured, the voltage signal being a voltage signal acquired by each of receiver modules for the ground where the region to be measured is located; and respectively processing the current signal and the voltage signal to obtain an apparent resistivity of the region to be measured; wherein the receiver modules each comprise a voltage recorder and at least three receiving electrodes, the receiving electrodes each are connected to the ground, and configured to acquire a voltage signal flowing through the ground; and the voltage recorder is connected to each of the receiving electrodes, and configured to acquire the voltage signal and the apparent polarizability of the ground where the region to be measured is located, and record the voltage signal and the apparent polarizability, and wherein when there are three receiving electrodes, the three receiving electrodes are arranged in an L-shaped distribution.

5. The distributed 3D IP data acquisition and processing method according to claim 4, wherein the transmitter module comprises: a transmitter, a current recorder and at least two transmitting electrodes, wherein
the transmitter is configured to transmit the preset current signal;
the transmitting electrodes each are connected to the transmitter and the ground, and configured to transmit the current signal to the ground; and
the current recorder is connected to each of the transmitting electrodes, and configured to record the current signal transmitted by the transmitter in real time.

6. The distributed 3D IP data acquisition and processing method according to claim 4, wherein the transmitter module and the receiver module each are provided with a global positioning system (GPS) locator.

7. The distributed 3D IP data acquisition and processing method according to claim 4, further comprising: analyzing, according to the apparent polarizability and the apparent resistivity, a polarizability and a conductivity of the region to be measured.

8. The distributed 3D IP data acquisition and processing method according to claim 5, further comprising: analyzing, according to the apparent polarizability and the apparent resistivity, a polarizability and a conductivity of the region to be measured.

9. The distributed 3D IP data acquisition and processing method according to claim 4, further comprising: analyzing, according to the apparent polarizability and the apparent resistivity, a polarizability and a conductivity of the region to be measured.

10. The distributed 3D IP data acquisition and processing method according to claim 4, further comprising: analyzing, according to the apparent polarizability and the apparent resistivity, a polarizability and a conductivity of the region to be measured.

11. The distributed 3D IP data acquisition and processing method according to claim 6, further comprising: analyzing, according to the apparent polarizability and the apparent resistivity, a polarizability and a conductivity of the region to be measured.

12. The distributed 3D IP data acquisition and processing method according to claim 4, wherein the respectively processing the current signal and the voltage signal to obtain an apparent resistivity of the region to be measured specifically comprises:
reading the current signal and the voltage signal and performing time matching on the current signal and the voltage signal to obtain time matched current data and time matched voltage data;
transforming a position number of each of receiving electrodes corresponding to the time matched voltage data to obtain an actual coordinate of each of the receiving electrodes; and
computing the apparent resistivity based on the time matched current data, the time matched voltage data, the actual coordinate of each of the receiving electrodes, and an actual coordinate of each of transmitting electrodes.

13. The distributed 3D IP data acquisition and processing method according to claim 5, wherein the respectively processing the current signal and the voltage signal to obtain an apparent resistivity of the region to be measured specifically comprises:
reading the current signal and the voltage signal and performing time matching on the current signal and the voltage signal to obtain time matched current data and time matched voltage data;
transforming a position number of each of receiving electrodes corresponding to the time matched voltage data to obtain an actual coordinate of each of the receiving electrodes; and
computing the apparent resistivity based on the time matched current data, the time matched voltage data, the actual coordinate of each of the receiving electrodes, and an actual coordinate of each of transmitting electrodes.

14. The distributed 3D IP data acquisition and processing method according to claim 4, wherein the respectively processing the current signal and the voltage signal to obtain an apparent resistivity of the region to be measured specifically comprises:
reading the current signal and the voltage signal and performing time matching on the current signal and the voltage signal to obtain time matched current data and time matched voltage data;
transforming a position number of each of receiving electrodes corresponding to the time matched voltage data to obtain an actual coordinate of each of the receiving electrodes; and
computing the apparent resistivity based on the time matched current data, the time matched voltage data, the actual coordinate of each of the receiving electrodes, and an actual coordinate of each of transmitting electrodes.

15. The distributed 3D IP data acquisition and processing method according to claim 12, wherein the apparent resistivity $P_s$ is specifically computed as follows:

$$P_s = \frac{K \cdot V}{I};$$

and $$K = \frac{2\pi}{\frac{1}{AM} - \frac{1}{AN} - \frac{1}{BM} + \frac{1}{BN}},$$

wherein, A and B are the transmitting electrodes, M and N are the receiving electrodes, AM represents a distance between the transmitting electrode A and the receiving electrode M, AN represents a distance between the transmitting electrode A and the receiving electrode N, BN represents a distance between the transmitting electrode B and the receiving electrode N, BM represents a distance between the transmitting electrode B and the receiving electrode M, $\pi$ represents a circular constant, V represents a measured potential difference, I represents a transmitting current, and K represents a dimensionless coefficient associated with a position of each of the transmitting electrodes and the receiving electrodes.

16. The distributed 3D IP data acquisition and processing method according to claim 7, wherein the analyzing, according to the apparent polarizability and the apparent resistivity, a polarizability and a conductivity of the region to be measured specifically comprises:

inverting the actual coordinate of each of the receiving electrodes, the actual coordinate of each of the transmitting electrodes, the apparent resistivity and the apparent polarizability with 3D inversion software to obtain 3D distribution data, the 3D distribution data being configured to reflect underground polarizability and conductivity of the region to be measured; and visualizing the 3D distribution data with a 3D slicing technology or a spatial contour drawing method to obtain a 3D slice map for the apparent polarizability, a contour map for the apparent polarizability, a 3D slice map for the apparent resistivity and a contour map for the apparent resistivity.

\* \* \* \* \*